United States Patent

Frangatos

[15] 3,692,840
[45] Sept. 19, 1972

[54] PROCESS FOR PRODUCING ALDEHYDES AND KETONES

[72] Inventor: Gerassimos Frangatos, c/o Mobil Research and Development Corporation, Paulsboro, N.J. 08066

[22] Filed: July 16, 1969

[21] Appl. No.: 842,366

Related U.S. Application Data

[63] Continuation-in-part of Ser. No. 476,176, July 30, 1965, abandoned.

[52] U.S. Cl. ............ 260/586 B, 252/455 Z, 260/599, 260/603 C, 260/596, 260/591
[51] Int. Cl. .............................................. C07c 45/16
[58] Field of Search ....... 260/599, 603 C, 596, 586 B, 260/591

[56] References Cited

UNITED STATES PATENTS

| | | | |
|---|---|---|---|
| 1,827,317 | 10/1931 | Jaeger | 260/596 |
| 3,254,034 | 5/1966 | Dwyer | 252/455 Z |
| 1,694,122 | 12/1928 | Jaeger | 260/524 R |

FOREIGN PATENTS OR APPLICATIONS

| | | | |
|---|---|---|---|
| 609,717 | 11/1960 | Canada | 260/586 |
| 978,261 | 12/1964 | Great Britain | 252/455 Z |

*Primary Examiner*—Bernard Helfin
*Attorney*—Oswald G. Hayes, Andrew L. Gaboriault, Raymond W. Barclay and James F. Woods

[57] ABSTRACT

The process for converting alcohols of the formula

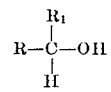

to organic compounds of the formula

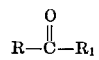

wherein R and $R_1$ are selected from the group consisting of hydrogen and a hydrocarbon radical which comprises contacting the alcohol at a temperature of from 150° C. to 400° C. in the presence of a free oxygen-containing gas with a crystalline aluminosilicate catalyst having a uniform pore structure and a pore size between about 4 and about 15 Angstrom units containing a metallic cation of a transition metal having more than one valence.

7 Claims, No Drawings

PROCESS FOR PRODUCING ALDEHYDES AND KETONES

CROSS-REFERENCES TO RELATED APPLICATION

This application is a continuation in-part of application Ser. No. 476,176, filed July 30, 1965, and now abandoned, entitled PROCESS FOR PRODUCING ALDEHYDES AND KETONES.

BACKGROUND OF THE INVENTION

FIELD OF THE INVENTION

This invention relates to a process for catalytically oxidizing alcohols to produce aldehydes and ketones. More particularly, this invention relates to a process for oxidizing primary or secondary alcohols to produce aldehydes or ketones respectively in the presence of a crystalline aluminosilicate catalyst in which a major portion of the metal cations constitute transition metals having more than one valence.

Aldehydes are presently produced by a host of reactions including the dehydrogenation of primary alcohols in the presence of certain well known oxidizing catalysts. However, when these catalysts are employed, other reactions occur which produce additional products such as acids, ethers and hydrocarbons which result in a reduced yield of aldehyde product. It is desirable to conduct the conversion of primary alcohols to their corresponding aldehydes in a highly selective manner in order to increase aldehyde yield while, at the same time, minimizing subsequent product separation steps. Aldehydes, at the present time, find a great many uses, as for example, in the production of polymers, explosives and drying oils. Ketones, on the other hand, are produced by oxidizing secondary alcohols. Here again, it is desirable to conduct the reaction in a selective manner so as to minimize the production of other products such as hydrocarbon and the corresponding acid due to the oxidation of the enolic form of the ketone.

It has now been found that the primary or secondary alcohols can be selectively converted respectively to their corresponding aldehydes or ketones by contacting the same with a gas containing free oxygen at a temperature between 150° and 400° C., in the presence of a metal crystalline aluminosilicate, a major portion of the metal cation of which constitute a transition metal having more than one valance. The reactions involved in the process of the present invention are shown by the following chemical equation:

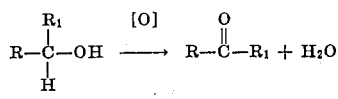

wherein R and $R_1$ are selected from the group consisting of hydrogen and a hydrocarbon radical.

According to the process of this invention, a primary or secondary alcohol is contacted in a reaction zone under oxidizing conditions with a crystalline aluminosilicate which has been base exchanged with an ion of a transition metal having more than one valence. The alcohol can be introduced either in the liquid or vapor state depending upon the reaction conditions necessary for conversion. The aluminosilicate catalyst is preferably in the form of discrete particles in order to afford a relatively large surface area available for promoting the reaction. The method for contacting the alcohol and catalyst is not critical. Thus the catalyst in the reaction zone can be maintained as a fixed or moving bed or in a fluidized condition. When employed in a moving or fixed bed, the catalyst is usually in pellet form, or a size less than about ½ inch diameter and preferably between about 1/16 to about ¼ inch diameter, i.e., 8 to 10 mesh. When employed in a fluidized bed, the catalyst is of a size in the range of from about 10 to about 150 microns.

The process of the present invention is carried out in the presence of a free oxygen containing gas. The amount of free oxygen containing gas supplied to the reaction zone is sufficient to promote conversion of the alcohol to the corresponding aldehyde or ketone while at the same time not being at such a high concentration level in combination with the effect of catalyst surface area which will promote conversion of the aldehyde or ketone product to the corresponding organic acid. The concentration level of free oxygen containing gas can be controlled either by carefully measuring the stoichiometric amount necessary to support conversion to the ketone or aldehyde or by supplying a diluent in an amount sufficient to suppress the function of the free oxygen-containing gas in localized portions of the catalyst. Thus air can be conveniently employed as the free oxygen-containing gas since relatively good control of the oxidation reaction can be maintained thereby. After the alcohol reactant and free oxygen-containing gas have been contacted with the aluminosilicate catalyst, the reactor effluent containing the aldehyde or ketone product is recovered and separated to obtain the aldehyde or ketone and unreacted alcohol as separate streams. The unreacted alcohol can then be recycled to the reaction zone.

The reaction is carried out in the presence of a free oxygen-containing gas at conversion conditions. Thus the temperature is maintained sufficiently high to support conversion to the aldehyde or ketone while not producing degradation of either the alcohol starting material or the product. The conversion temperature is dependent upon the particular alcohol employed and is usually in the range of from about 200° C. to about 400° C., preferably from about 250° C. to 350° C. The pressure employed can range from atmospheric to about 500 psi and is not critical in the conversion process of the present invention. The alcohol feed rate is expressed as either vapor space velocity or liquid hourly space velocity depending on whether the alcohol is introduced as a liquid or as a vapor. Thus when being introduced as a vapor, the alcohol is contacted at a rate of from 10 to about 1000 and preferably from about 20 to about 100 volumes per volume of catalyst per hour or when employed in liquid form, the liquid hourly space velocity (L.H.S.V.) is maintained at from about 0.1 to about 10 and preferably from about 1 to about 5 volumes of alcohol per volume of catalyst per hour. The amount of free oxygen-containing gas supplied to the reaction zone is dependent upon whether a primary alcohol or secondary alcohol is employed as a reactant. This is due to the fact that aldehydes generally exhibit a lower resistance to oxidation than do ketones and are thus more likely to be converted to the corresponding organic acid. The free oxygen-containing gas is supplied in an amount sufficient to support reaction but in an amount less than that which will further oxidize the ketone or aldehyde product. When a primary alcohol is employed as a reactant to produce aldehydes, the free oxygen-containing gas is supplied to the reaction zone in an amount of from about 0.10 moles of oxygen to about 0.5 moles of oxygen per mole of alcohol reactant. When a secondary alcohol is employed as a reactant to produce ketones, the free oxygen-containing gas is supplied to the reaction zone in an amount of from about 0.1 moles to about 1.0 moles per mole of alcohol reactant. In carrying out the reaction, the temperature can be maintained by either heating the catalyst bed or heating the alcohol feed. When the effluent is in vapor form, it is first condensed by cooling and the aldehyde or ketone is subsequently separated from the unreacted alcohol.

The primary alcohols which can be employed in the process of this reaction can be either aliphatic or cyclic primary alcohols which have a molecular size which is sufficiently small to facilitate entry and exit from the aluminosilicate pore structure in a manner described below. Thus the process of this invention can be employed with a primary aliphatic alcohol including $C_1$ to $C_{20}$ alkanols such as methanol, ethanol, n-propyl alcohol, n-butyl alcohol, isobutyl alcohol, and the like, unsaturated aliphatic alcohols including allyl alcohol, methallyl alcohol, crotyl alcohol and the like, and aromatic primary alcohols such as benzyl alcohol, B-phenylethyl alcohol, cinnamyl alcohol and the like.

Similarly, the secondary alcohols employed to produce ketones can be aliphatic or cyclic alcohols and have a molecular size sufficiently small to facilitate entry and exit from the aluminosilicate pore structure. Examples of secondary alcohols which can be employed to produce ketones include alkanols such as isopropyl alcohol, secondary butyl alcohol, 2-pentanol and the like, and cyclic secondary alcohols such as cyclohexanol, diphenylcarbinol and the like.

The crystalline aluminosilicate catalysts employed in the process of the present invention can function as molecular sieves and are characterized by uniform pore openings of between about 4 to about 15 Angstrom units. These catalysts generally are prepared by base exchange of an initially formed alkali metal aluminosilicate with a metallic cation of a transition metal having more than one valence prior to contact with the alcohol reactant. Aluminosilicate catalysts characterized by relatively small pore openings can be employed as molecular sieves to selectively convert certain alcoholic components from a mixture of alcohols. When these relatively small pore sized aluminosilicates are employed, alcohols consisting of relatively large molecules are excluded from the interior of the catalyst crystals and thus do not contact the catalyst sites therein, while alcohols characterized by relatively small molecules can easily enter the crystal pore structure and be converted therein upon contact with the catalyst sites. Thus aluminosilicate catalysts having uniform pore openings of about 5 Angstrom units such as zeolite A will permit alcohols such as methanol and ethanol to enter and exit readily but will selectively exclude alcohols such as isopropanol and isobutanol. On the other hand, when aluminosilicate catalysts having relatively large pore openings are employed, alcohols having a wide range of molecular sizes can easily enter and exit the catalyst structure.

The catalysts which can be employed herein to convert primary and secondary alcohols to aldehydes and ketones respectively are prepared from crystalline sodium aluminosilicates including zeolite A, zeolite X and zeolite Y. Zeolite A and a process for producing the same are described in U.S. Pat. No. 2,882,243. Zeolite X and a process for producing the same are described in U.S. Pat. No. 2,882,244. Zeolite Y and a process for producing the same are described in U.S. Pat. No. 3,130,007.

As indicated above, the majority of the sodium ion of the zeolite catalyst is replaced with a metallic cation of a transition metal having more than one valence and capable of catalyzing oxidation reactions. Among the cations which can be employed are manganese, vanadium, nickel, cobalt, iron, chromium, antimony, lead, tin, molybdenum, tungsten, gold, copper, mercury, thallium, indium, osmium, niobium, platinum, palladium, rhodium, praseodymium, neodymium, samarium, europium, gadolinium, dysprosium and mixtures thereof. The cations are zeolitically introduced into the crystalline aluminosilicate by replacement of the sodium ions therein without an accompanying change in the aluminosilicate structure. Replacement is suitably accomplished by contacting the crystalline sodium aluminosilicate with a solution of an ionizable compound of the metallic ion which is to be introduced into the structure for a sufficient time to afford the desired extent of introduction. After such treatment, the resulting exchanged product is water washed and dried and is thereafter ready for use. The extent to which the zeolite is base exchanged can be controlled by the molar strength of ionizable compound solution employed and the contact time of solution and zeolite. For purposes of the present invention, it is desirable that above about 20 weight percent of the sodium ion be replaced with transition metal cation and preferably above about 50 weight percent in order to effect relatively high conversion.

The ion exchange step to produce the aluminosilicate catalysts employed in the process of the present invention can be carried out at a temperature of from about 10° C. to about 90° C., and for a period of time of from about 1 hour to about 10 hours. A wide variety of transition metal salts can be employed as a source of transition metal ions having more than one valence. Among the transition metal salts which can be employed are the chlorides, bromides, iodides, fluorides, carbonates, bicarbonates, sulfides, sulfates, nitrates, thiocyanates, peroxysulfates, acetates, benzoates, citrates, formates, propionates, butyrates, valerates, lactates, malonates, oxalates, palmitates, tartarates and hydroxides. The only limitations on the particular transition metal salt or salts employed is that it be sufficiently soluble in the fluid medium in which it is employed to give the necessary transition metal transfer to the aluminosilicate. The preferred transition metal salts are the chlorides and nitrates. After being contacted with the transition metal salt solution, the crystalline aluminosilicate is recovered and water washed until free of sodium or the anion.

In the process of this invention, the aluminosilicate component can be combined, dispersed or otherwise intimately admixed with a porous matrix in such proportions that the resulting product contains about 1 to 95 weight percent and preferably from about 2 to about 80 weight percent of the aluminosilicate in the final composition. The incorporation of the aluminosilicate into the porous matrix can be accomplished either before, after or during treatment with the fluid medium.

The term "porous matrix" includes organic and/or inorganic compositions with which the aluminosilicate can be combined, dispersed or otherwise intimately admixed wherein the matrix may be active or inactive. It is to be understood that porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, activated charcoal, refractory oxides, organic resins, such as polyepoxides, polyamines, polyesters, vinyl resins, phenolics, amino resins, melamines, acrylics, alkyds, epoxy resins, etc., and inorganic oxide gels. Of these matrices, the inorganic oxide gels are particularly preferred because of their superior porosity, attrition resistance, and stability under reaction conditions herein.

The aluminosilicate-inorganic oxide gel compositions can be prepared by several methods wherein the aluminosilicate is reduced to a particle size less than 40 microns, preferably within the range of 1 to 10 microns and intimately admixed with an inorganic oxide gel while the latter is in a hydrous state such as in the form of a hydrosol, hydrogel, wet gelatinous precipitate or a mixture thereof. Thus, finely divided active aluminosilicates can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Pat. No. 2,384,946. The aluminosilicate-siliceous gel thus obtained is washed free of soluble salts and thereafter dried and/or calcined as desired.

In a like manner, the active aluminosilicate may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel or wet gelatinous precipitate or hydrous oxide.

The inorganic oxide gel may also consist of a semiplastic or plastic clay mineral. The aluminosilicate can be incorporated in the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc.

The inorganic oxide gel may also consist of a plural gel comprising a predominant amount of silica with one or more metals or oxides thereof selected from Groups IB, II, III, IV, V, VI, VII and VIII of the Periodic Table. Particular preference is given to plural gels of silica with metal oxides of Groups IIA, III and IVA of the Periodic Table, especially wherein the metal oxide is magnesia, rare earth oxide, alumina, zirconia, titania, beryllia, thoria or combinations thereof. The preparation of plural gels is well known and generally involves either separate precipitation or coprecipitation techniques in which a suitable salt of the metal oxide is added to an alkali metal silicate and an acid or base, as required, is added to precipitate the corresponding oxide.

While the above-named metallic cations can be incorporated into the aluminosilicate catalysts to effect the conversions shown above, it is preferred to employ a transition metal such as manganese and chromium. It has been found that crystalline aluminosilicates which are base exchanged with the manganese ion exhibit a high selectivity in converting primary and secondary alcohols to aldehydes and ketones respectively.

The following examples are intended to enable a full understanding of the process of the present invention and are not to be interpreted as imposing any limitation on the same.

EXAMPLE 1

Twenty five grams of a sodium crystalline aluminosilicate of the "Y" series which analyzed as 12.9 weight percent $Na_2O$, 20.8 weight percent $Al_2O_3$, 66.8 weight percent $SiO_2$, $SiO_2/Al_2O_3$ ratio of 5.45 and Na/Al ratio of 1.02 was suspended in 200 ml. of a 2N aqueous solution of $MnCl_2$. The suspension thus obtained was vigorously stirred overnight at room temperature. The reaction mixture was subsequently filtered through a sintered glass funnel and washed on the filter several times with distilled water until the washings were free of chloride ion. The solid zeolite material was collected and transferred to a vacuum dessicator to be dried for four hours at room temperature. The superficially dried zeolite was then pelleted to a size of about ⅛ inch diameter. A 5cc bed of the pellets was placed in a vycor reactor of ¾ inch inside diameter and supported therein by means of a glass wool plug. On top of the bed, 10cc of glass beads were placed to increase the surface of the preheating zone. The zeolite catalyst was then activated by maintaining a reaction zone temperature of about 275° C in the presence of a stream of air flowing at the rate of about 45 liters 1 hour. During the activation process which lasted four hours, the catalyst bed turned brown and subsequently black due to the oxidation of manganese to the higher oxidation states of 3+ and 4+. Discontinuance of the air flow and introduction of hydrogen gas through the heated catalyst bed rendered the color thereof lighter because of the reduction of the manganese to the 2+ oxidation state.

EXAMPLE 2

The activated catalyst bed described in Example 1 was heated to 330° C. Benzyl alcohol was then introduced into the reaction zone to contact the catalyst by means of a motor driven syringe at a rate of 28.8 cc/hr. and an LHSV of 5.76. Air was allowed to flow through the reaction zone at the rate of 8.5 liters/hr throughout the reaction. An exothermic reaction resulted which increased the reaction temperature by 25°–28 C. The vaporous effluent was liquefied by cooling to 0° C. in a flask containing 2, 6-di-tert-butyl p-cresol which functions to substantially prevent autoxidation of the benzaldehyde product. Fractional distillation and vapor phase chromatography were employed for the separation and identification of the effluent components. Sixteen percent conversion and better than 90 percent selectivity with regard to the benzeldehyde formation were attained. No change of catalytic activity was observed over six one-hour runs.

EXAMPLE 3

The catalyst prepared as shown in Example 1 is heated to 250° C. and octanol-1 is introduced into the reaction zone in a manner described in Example 2 at the rate of 25 cc/hr and a LHSV of 5. Air is directed through the reaction zone at a rate of 8 liters/hour. The effluent from the reaction zone is collected in an ice cooled receiver and analyzed by distillation and vapor phase chromatography. Average pass conversion of 90 percent are observed with average yields of 70 percent of octanol-1.

EXAMPLE 4

The catalyst prepared by the process shown in Example 1 is heated to 250° C. and cyclohexanol is introduced into the reaction zone in a manner described in Example 2 at the rate of 25 cc/hr and a LHSV of 5. Air is directed through the reaction zone at a rate of 8 liters/hour. The effluent is collected in an ice cooled receiver and analyzed by distillation and vapor phase chromatography. Cyclohexanone is recovered in 80 percent yield.

EXAMPLE 5

Employing the base exchange technique described in Example 1, a chromium exchanged zeolite Y is prepared. The catalyst is then heated to 350° C. and benzyl alcohol is introduced into the reaction zone in a manner described in Example 2 at a LHSV of 5. Air is directed through the reaction zone at a rate of 8 liters/hour. The effluent is analyzed and shows a conversion of 20 percent and a selectivity of 90 percent to benzylaldehyde.

I claim:

1. The process for converting alcohols of the formula

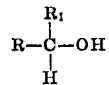

to organic compounds of the formula

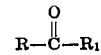

wherein R and $R_1$ are selected from the group consisting of hydrogen and a hydrocarbon radical which comprises contacting the alcohol at a temperature of from 150° C to 400° C in the presence of a free oxygen-containing gas with a crystalline aluminosilicate catalyst of zeolite Y containing cations selected from the group consisting of manganese and chromium said catalyst having been activated by treatment with air and then hydrogen at elevated temperature.

2. The process of claim 1 wherein the alcohol is a a alcohol.

3. The process of claim 1 wherein the cation is manganese.

4. The process of claim 2 wherein the primary alcohol is benzyl alcohol.

5. The process of Claim 1 wherein the cation is chromium.

6. The process of claim 1 wherein the free oxygen-containing gas is supplied to the reaction zone in an amount of from about 0.1 mole to about 1.0 mole per mole of alcohol.

7. The process of claim 1, wherein the alcohol is a secondary alcohol.

* * * * *